Sheet 1. 3 Sheets.

J. Read.

Mower.

No 389

Reissued Aug. 19, 1856.

Sheet 2. 3 Sheets.

J. Read.

Mower.

No. 389

Reissued Aug. 19, 1856.

Sheet 3. 3 Sheets
J. Read.
Mower.
No. 389
Reissued Aug. 19/
Fig. 4.
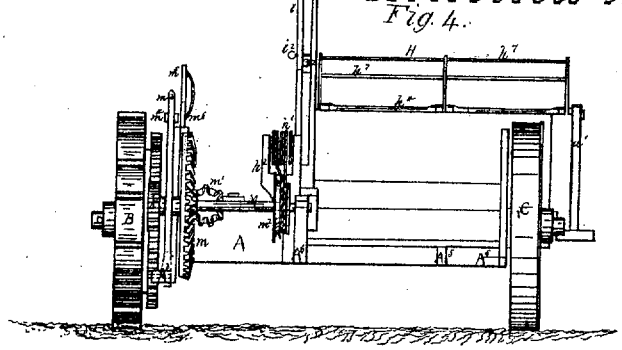
Fig. 6.
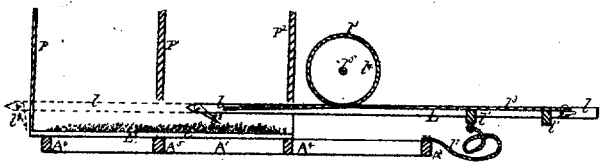
Fig. 5.
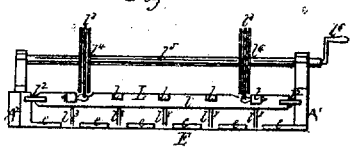
Fig. 9.
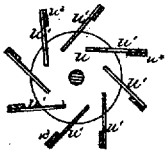
Fig. 8.
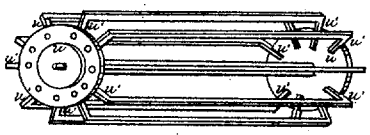
Fig. 7.
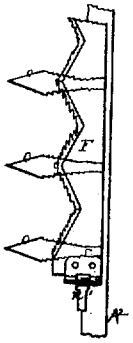
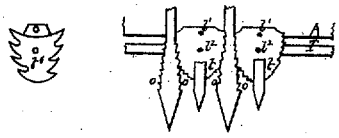
Fig. 12.
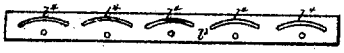
Fig. 13.
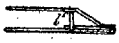

UNITED STATES PATENT OFFICE.

JONATHAN READ, OF ALTON, ILLINOIS.

IMPROVEMENT IN REAPING-MACHINES.

Specification forming part of Letters Patent No. 2,488, dated March 12, 1842; extended seven years; Reissue No. 389, dated August 19, 1856.

DIVISION C.

*To all whom it may concern:*

Be it known that I, JONATHAN READ, of Alton, in the county of Madison and State of Illinois, have invented certain new and useful Improvements in Harvesting-Machines, of which the following is a full, clear, and exact description, reference being had to the accompanying drawings, which make part of this specification, in which—

Figure 1:
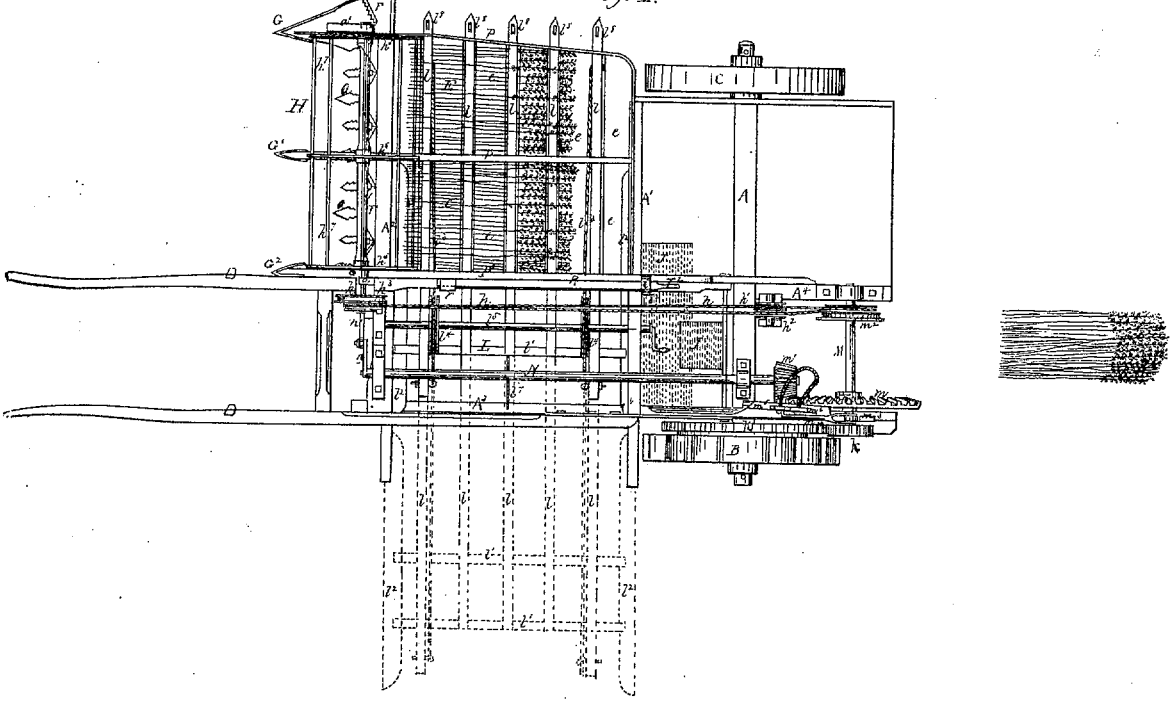
Figure 3:
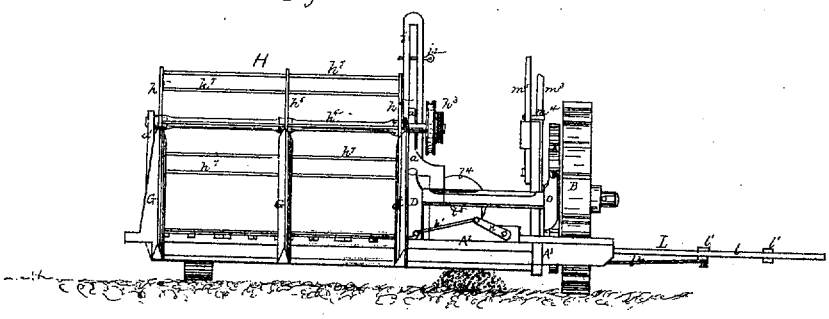
Figure 2:
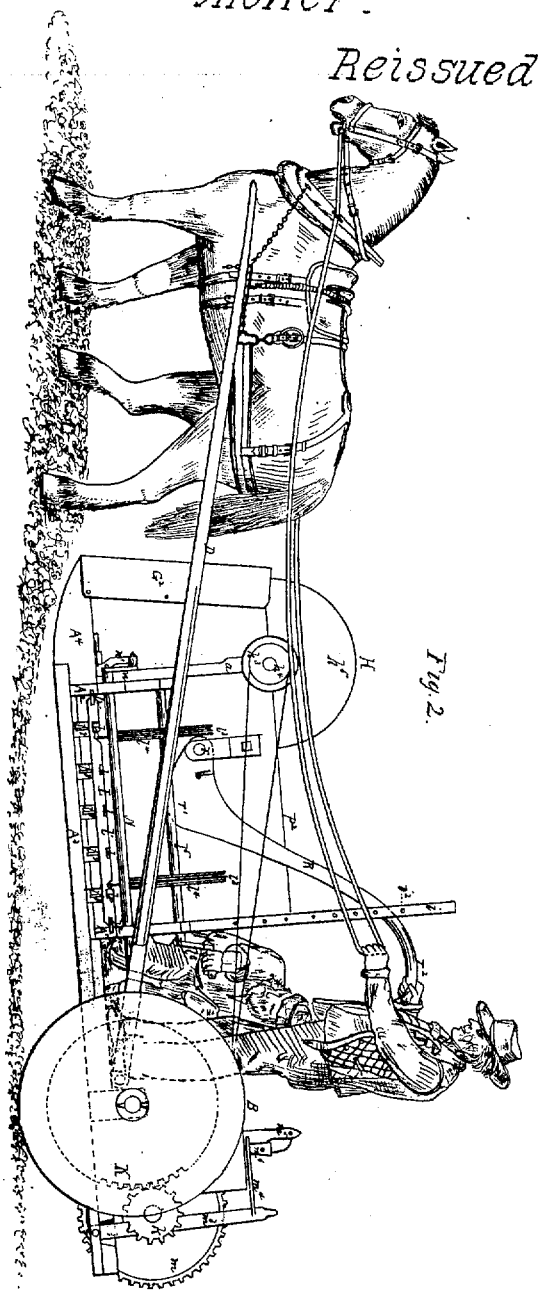

Figure 1 represents a plan or top view of a reaping-machine embracing my said improvements. Fig. 2 represents an elevation of the left side of the same. Fig. 3 represents an elevation of the front side of the same. Fig. 4 represents an elevation of the rear side of the same. Fig. 5 is a detached view, representing the outer or left end of an automatic rake to discharge the cut grain from the platform, together with the mechanism for operating it, also the platform which receives the cut grain and carries it until sufficient has accumulated to form a gavel. Fig. 6 represents a longitudinal section of the rake, the platform of slats and spaces, the screen or roof to receive the grain that falls while the platform is being cleared by the rake, and guards or strippers to remove the grain at the proper time from the screen and deposit it on the platform. Fig. 7 is a detached plan of my improved guard-fingers and sickle. Of the remaining figures, representing modifications of various parts of my improvements in the reaper, Fig. 8 is a detached view, in perspective, of a modification of the reel; and Fig. 9 is a transverse section of another modification of the same. Fig. 10 is a plan of a modification of the cutting apparatus, and Fig. 11 is a detached view of a clearing-plate used with the same. Fig. 12 is a plan of the guard-plate, also used with the cutter and guard-fingers shown in Figs. 10 and 11. Fig. 13 is a sectional view of the cutter seen in Fig. 10, of the clearing-plate seen in Fig. 11, and the iron guard-plate seen in Fig. 12, showing the manner in which they are united.

When the left and right sides of the machine, or any parts thereof, are mentioned in this specification it is to be understood that it is intended to designate those sides or parts which are respectively on the right and left hand of an observer standing on the middle of the rear side of the machine, looking toward its front side.

My invention consists in combining with the reel which gathers the grain to the cutters and lays it on the platform a station or place on the frame for the raker where, with his weight supported mainly by the driving-wheel, he may ride during the performance of his labor and be in a position where he can with a fork or other instrument free the reel or cutting apparatus in case either shall become obstructed by the entanglement of grain upon it.

The frame of this machine, which in its general form is quadrilateral, and consists principally of the cross-bars A, A′, and $A^2$ and the longitudinal bars $A^3$, $A^4$, $A^5$, and $A^6$, is supported and moved, like an ordinary cart, by two wheels, B and C, whose axles are respectively at the ends of the main cross-bar A, and by the thills D, (hinged to the frame near the line of the axis of the wheels,) upon which the slightly-preponderating weight of the forward part of the machine rests. The whole of the main frame of the machine is covered with either a tight or a slatted floor, except a space near the front on the left side for the gavel of cut grain to drop through to the ground when discharged from the platform, as hereinafter particularly described, and a space near the rear of the left side, which is occupied by the main gearing. The front portion, E, of the flooring on the right, which is formed of parallel slats *e*, running across the machine parallel to the sickle F, constitutes the platform on which the cut grain is gathered by the reel and carried until a sufficient quantity to form a gavel has accumulated.

On the front edge of the frame and in front of the platform the cutting apparatus and the dividers G G′ $G^2$ are situated, and immediately above these is placed the reel H. At the left rear corner of the platform a station, I, is arranged on the floor for the driver of the horses, whose duty it is also to regulate the height of the cut, and connect and disconnect the cutters F and the reel H with the driving-gear.

Near the station for the driver, and immediately in front thereof, a station, J, is also arranged for the attendant whose duty it is to rake the grain from the platform, and to free the reel, dividers, and cutters from any straw or grass that may be entangled therewith, and which, if suffered to accumulate, would clog the machine and render a stoppage for the purpose of clearing it necessary.

Connected with the inner face of the left supporting-wheel, B, which is heavy and strong, and gives motion to the mechanism that drives the reel H and sickle F, is a spur-cog wheel, K, gearing into a pinion, $k$, upon the shaft M. This shaft bears also the bevel-wheel, $m$, which gears into a bevel-pinion, $m'$, on the rear end of the shaft N, which turns in suitable bearings in the frame and drives the sickle F by means of the crank $n$ and connecting-rod $n'$. The cutter F is made of plate-steel with a scalloped serrated edge, and it acts in connection with a series of guard-fingers, O, also serrated and shaped like a spear-head with protuberant edges, as shown in Fig. 7, and hereinafter more fully described; or these fingers and others with straight edges may be used alternately, as shown in Fig. 10. The gearing-shaft M also bears a pulley, $m^2$, carrying the band $h$, which, after crossing and passing over the guide-pulleys $h'$ on a standard, $h^2$, extends to and encircles the pulley $h^3$ on the shaft $h^4$ of the reel H to rotate the latter. This reel consists of the said shaft $h^4$, supported in suitable bearings in the standards $a$ and $a'$, and of two disks or heads, $h^5$, and an intermediate disk, $h^6$, secured upon the shaft. The disks are connected by wires or ribs $h^7$, which in the revolutions of the reel press the grain back against the cutters and deposit it upon platform. These ribs may run straight between the heads, or they may cross diagonally.

The journal of the gear-shaft M is set somewhat loosely in its bearings at its right end, and is supported at its left end by a standard, $m^3$, pivoted at the bottom and connected above the shaft by the link $m^4$ to the lever $m^5$, which passes through a slot in the frame. By moving this lever the driver can at once turn back the standard $m^3$, and thus throw the pinion $k$ out of gear with the wheel K and the bevel-wheel $m$ out of gear with the pinion $m'$, thus stopping both the cutter and the reel while the machine is in motion. A wedge, $m^6$, is provided, which, being introduced into the slot before or behind the lever $m^5$, will retain it either in a position to hold the wheels and pinions in or out of gear with each other, as may be desired.

The mechanical rake is formed with arms $l$, which perform the double office of handles for the rake-teeth and a screen or roof, the function of which will presently be described. These arms are connected by cross-bars $l'$, and provided with slides $l^2$, which work in grooves on the inside of the front cross-bars, A′ and $A^2$. The rake is driven by bands or cords $l^3$, (see Figs. 5 and 6,) which are attached at their ends to the right and left ends of two of the arms $l$, and pass around the pulleys $l^4$ on the shaft $l^5$. This shaft rests in suitable bearings resting on the cross-bars A′ and $A^2$, and is provided with a winch, $l^6$, by the handle of which the attendant turns the shaft in one direction, and, winding the left ends of the bands upon the pulleys, thrusts the rake over the platform E, and by reversing the motion of the handle withdraws the rake again, brings off the gavel of grain from the platform, and drops it through the opening in the floor upon the ground. A cord, $l'$, attached at one end to the left side bar, $A^3$, of the frame and at the other to one of the cross-bars $l'$ of the rake, determines the extent of its motion in either direction.

The rake-teeth $l^8$, instead of being attached to a common head, are each in this instance attached to the right end of one of the arms $l$. These teeth are so hinged to the arms that while they will readily be folded up in passing to the right by any obstruction they meet, as shown in Fig. 6, they cannot be pressed to the right or outward beyond a certain acute angle—say eighty degrees, (shown in the dotted lines, Fig. 6.) Consequently they will readily flex or fold inward to raise their points to pass over the grain during the forward motion of the rake, but unfold and hang down to catch and sweep the grain off the platform during the return of the rake.

In order to permit the rake-teeth to extend below the grain, and thus prevent it from being overrun, the platform E is constructed not of an even floor, but of a number of slats $e$, with slots between them, in which the rake-teeth work, as already described. The gavel of grain, being thus raked off, is dropped on the ground immediately at the left end of the platform, and inside of and out of the path of the driving-wheel, as well as outside of the path in which the horses travel while the machine is cutting the next swath.

On the right side of the platform E is a fence or guard, P, to prevent the grain from falling or being pushed over upon the ground, which guard is provided with slots through which the ends of the arm and the rake-teeth may pass, and thus get beyond the grain on the platform before returning to sweep it off. At the center of the platform, and also at the left side thereof, similar guards or strippers, P′ $P^2$, are placed, which, however, descend no lower than the top of the cross-bars $l$, that connect the arms of the rake. These guards serve the purpose of clearing off and depositing on the platform any grain which may fall upon the arms, while acting as a screen or roof to intercept the falling grain during the traverse of the rake, as shown in Fig. 6. In front of the rake these three guards all descend nearly to the cutter, and extend forward of it and of the reel, where they are armed with wedge-shaped iron caps G G′ $G^2$, which enter the standing grain and serve respectively, guard G to divide that to be cut from that to be left standing, guard $G^2$ to guide within the stroke of the cutters the grain to be cut on the left side of the swath, and guard G′ to separate the grain to be cut into two parcels, which are afterward still further subdivided by the fingers O.

In order that the cutting apparatus may be raised and lowered at pleasure by the driver, who is the sole conductor of the machine, to pass over stones or other obstacles, and also that the machine may be adjusted for any height at which it is desired to cut the stubble, the frame is hung or balanced upon the axes of the wheels B and C, and a regulating-lever, R, is used to turn it to swing the cutters up and down. This lever is pivoted, as shown in Fig. 2, to the frame by the pin $r$, upon which it may be turned, and it has a shoulder, $r'$, which rests upon the right side of the thills D. This shoulder acts as a sliding fulcrum, which, when the handle $r^2$ of the lever is depressed, will slide forward and raise the cutters, and when the handle is raised will slide back and lower the cutters. The handle $r^2$ is raised or depressed by the driver standing on the floor in his station at I, while at the same time he drives the horses. The handle of this lever passes through a slot in a standard, $i$, at the side of the driver's station, where by means of a pin, $i^2$, and a series of holes in the standard it is retained in any desired position.

The different parts of this machine are so arranged, as shown in Fig. 1, that a place or stand, J, is provided for the attendant who rakes, and another, I, for the attendant who drives, where their weight is chiefly borne by the wheels, and where the raker has under his immediate control the handle of the rake-winch $l^6$, and the driver has under his control the handle $r^2$ of the adjusting-lever R and the gearing and ungearing lever $m^5$.

An advantage of the scalloped cutter over one with a straight edge is that it is not so quickly or easily dulled, or, rather, that, on account of the shear cut with which it operates, it cuts more easily, and so keen an edge is not requisite. An amount of use which would render a straight-edged sickle unfit for further service would not seriously impair the efficiency of a scalloped-edge sickle. The advancing motion of the machine tends to cause the sickle to push the grain forward, press it down, and override it. This difficulty, however, in the scalloped blade is compensated by the bite upon the grain due to its oblique approach to the fingers, and this compensation is still further increased by making the fingers in the shape of a spear-head, so that their edges retreating or converging toward their shanks may render the angle between the edge of the blade and the edges of the fingers more acute, and afford a shoulder against which the grain is held while being cut; and as an additional security these retreating edges are armed with serrations, which, inclining backward, effectually prevent the grain from slipping forward and escaping from the cutter. This construction of the finger is shown in Figs. 1, 7, and 10. The edge of the sickle itself is also serrated as well as scalloped, which gives a far better cutting-edge than has heretofore been used. It is evident that if the serrations render the cutting more certain when they advance against the fingers in the direction in which they point or are inclined, the sickle would be less effective on one stroke than on the other if the serrations all inclined in one direction. This difficulty is avoided by giving to the sickle a stroke equal to the distance between the centers of the fingers, and at the same time serrating it in short sections, the teeth of one section leaning in one direction and those of the next section leaning in the opposite direction, those points which reach the centers of the fingers at the extremes of the strokes being those at which the change of direction in the motion of the sickle is made and from which the serration is reversed. Thus in each stroke all the serrations which act with the fingers in that stroke will advance with their points foremost toward the edges of the fingers. In the scalloped sickle the points of reversal of the serrations will of course be, as represented in the drawings, at the projecting and retreating angles of the blade.

The combination, with the spear-head finger, of the scalloped sickle with reversed serrations constitutes, it is believed, the most efficient cutting apparatus for a harvester hitherto known.

It has been found in practice that the speed at which a reaping-machine can with most efficiency be used and the cutter operate most successfully is too great for the strength of a raker walking by the machine to keep up with it and rake the grain from the platform. Consequently the limit thus placed upon the speed is not only a loss of time, but a drawback upon the efficiency of the cutting. For these reasons it becomes necessary so to arrange the several parts of the reaper that a stand or seat may be provided for the raker, as already described, on which he can ride, and where at the same time he may be able, by a rake, to discharge the grain from the platform, and also be ready at once to relieve the reel, cutting apparatus, or divider of any tangled grain that may become fastened upon them.

The fatiguing nature of the labor in manipulating a hand-rake, and the want of regularity, thoroughness, and neatness with which its duty is often performed, have made it an important object to accomplish the discharge of the grain in gavels by mechanical means. I have constructed for this purpose a mechanical rake, which during the filling of the bed or platform is drawn back to the left; but when a sufficient quantity of grain has been reaped to form a gavel the attendant turns the winch $l^6$ and with it the shaft $l^5$ and pulleys $l^4$, which, through the cords $l^3$, draw the rake from the left and thrust the arms $l$ to the right over the platform, the rake-teeth $l^8$ folding up as they pass over the grain till the ends of the arms pass through the vertical slots in the fence P, when the teeth $l^8$ unfold again and fall into nearly an upright position, beyond which they cannot pass toward the right. The rake is then withdrawn by reversing the winch $l^6$. Its teeth seize the grain and draw it from the platform, and deposit it in a gavel upon the ground, between the left side of the platform and the track of the driving-wheel, as already set forth.

To secure the action of the rake-teeth upon all the grain on the platform, the latter is constructed of a number of slats or provided with a number of slots, along which the teeth pass and reaching thus below the grain entirely remove it. While the rake is discharging the grain its arms extend over the platform like a roof to receive the falling grain and keep the same separate from the gavel. The guards $P'$ $P^2$ strip off the arms what grain may have fallen thereon during their passage to and fro, and leave it upon the platform to make part of the next gavel. The left guard, $P^2$, only would ordinarily be sufficient for this purpose.

In deciding where, with reference to the machine, the gavel or bundle of grain raked from the platform should be deposited upon the ground, two objects are to be held in view—viz., the greatest reduction of the space over which the grain is to be raked, and the advantage, so far as even and clean work is concerned, of raking the grain from the platform in a straight line at right angles to the stalks; and, secondly, depositing it where it will not be liable to disturbance either from the wheels during the cutting of the same swath or from the horses during the succeeding passage of the machine in cutting the next swath. These two advantages I have succeeded in uniting at the same time that I relieve the horses in a great measure from the oppressive side draft usually attendant upon reapers and mowers in which the horse is in advance of the machine. This I have accomplished by placing the main driving-wheel outside of the line of draft, the opposite side of the machine being supported by a wheel inside of that line. Thus the resistance of the driving-wheel on the left side of the horses balances the resistance of the cutting and of the supporting-wheel on the right, making the draft even and parallel to the line of motion of the machine.

Between the end of the platform and the gearing and immediately behind the horses there is left a clear space, where the gravel can be deposited by the rake, as already fully set forth.

Certain modifications in the construction of the reel and of the cutting apparatus are described as follows: Instead of one vibrating cutter, I provide one vibrating bar, T, Fig. 10, to which a number of small cutters, $t$, are attached, each made of plate-steel and nearly in the shape of a heart, the points being carried foremost. Both sides of these cutters are sharp, with sickle-teeth reversed or inclining backward. The back of each cutter is fastened to the top of the front cross-bar $A^2$ by a bolt, $t'$, on which it plays freely. A little forward of the center of each cutter is another bolt, $t^2$, connecting with the vibrating bar T. As the bar T vibrates the points of the cutters $t$ are thrown to and fro, cutting the grain against the shoulders $o$. The distance between the bolts $t'$ and $t^2$ is sufficient to allow the points of the cutters to play nearly twice as far as the vibratory bar T moves. A flat plate, $t^3$, of thin iron rests on the cutters, and is permanently attached to the top of the front cross-bar $A^2$. (This plate is better seen in Figs. 12 and 13.) Above each cutter a semicircular slot, $t^4$, Fig. 12, is cut through the iron plate. A small iron stud, $t^5$, is permanently fastened to the top of each cutter, and extends up through each slot a short distance above the top of the iron plate. On the top of each stud is a clearing-plate, $t^6$, Fig. 11, of the same size as the cutter $t$, Fig. 10, but having deep circular notches, Fig. 11, on each side, curved backward from the point. The back of each clearing-plate is bent down, so that the back end is held by the same bolt that holds the back of each cutter. By this arrangement the clearing-plates move with the cutters and keep the cutters always clear of the falling grain.

The reel, instead of being formed with ribs of wire and heads, as represented in Figs. 1, 2, 3, and 4, is constructed, as represented in Figs. 8 and 9, with thin slats or ribs of wood. From the periphery of each head $u$ a number of arms, $u'$, extend radial, as in Fig. 8, or tangential, as in Fig. 9, forming an angle of not more than twenty-two degrees with a line drawn through the center of each head. These last-mentioned arms incline down and forward on the front side of the reel and up and backward on its rear side. On the ends of these arms are placed slats $u^3$, of thin wood or other suitable material, extending the whole length of the reel, and wide enough to draw in the grain to the cutters and deliver it upon the platform.

Having thus described my improvements as applied to one form of harvesting-machine and some of the modifications thereof, what I claim is—

The combination of the reel for gathering the grain to the cutting apparatus and depositing it on the platform, with the seat or position for raker located and arranged, substantially as described; to enable the raker to ride and rake the grain from the platform and free the reel and cutting apparatus from obstruction, as described.

In testimony whereof I have hereunto subscribed my name.

JONATHAN READ.

In presence of—
GEO. S. CARMICHAEL,
WM. G. PINCKARD.